(12) United States Patent
Theodore et al.

(10) Patent No.: US 8,888,890 B2
(45) Date of Patent: Nov. 18, 2014

(54) ORE LEACHING METHOD FOR METALS RECOVERY

(75) Inventors: Marcus G. Theodore, Salt Lake City, UT (US); Terry R. Gong, Moraga, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 148 days.

(21) Appl. No.: 13/317,005

(22) Filed: Oct. 6, 2011

(65) Prior Publication Data

US 2013/0089378 A1 Apr. 11, 2013

(51) Int. Cl.
*C22B 11/10* (2006.01)
*C22B 3/06* (2006.01)
*C22B 3/18* (2006.01)

(52) U.S. Cl.
CPC .... *C22B 3/06* (2013.01); *C22B 3/18* (2013.01)
USPC .......................................................... 75/392

(58) Field of Classification Search
None
See application file for complete search history.

(56) References Cited

U.S. PATENT DOCUMENTS

| | | | |
|---|---|---|---|
| 4,816,235 A | 3/1989 | Pesic | |
| 5,147,618 A * | 9/1992 | Touro et al. | 423/27 |
| 5,529,606 A * | 6/1996 | Hewlett | 75/743 |
| 5,534,234 A | 7/1996 | Reddin et al. | |
| 5,914,441 A | 6/1999 | Hunter et al. | |
| 7,416,668 B1 | 8/2008 | Theodore | |
| 7,429,329 B2 | 9/2008 | Theodore | |
| 7,455,773 B1 | 11/2008 | Harmon et al. | |
| 7,563,372 B1 | 7/2009 | Theodore | |
| 7,566,400 B2 | 7/2009 | Harmon et al. | |
| 7,867,398 B2 | 1/2011 | Harmon et al. | |
| 7,967,989 B2 | 6/2011 | Gong et al. | |
| 7,967,990 B2 | 6/2011 | Theodore et al. | |
| 2009/0294354 A1 * | 12/2009 | Theodore et al. | 210/602 |

OTHER PUBLICATIONS

"Leaching" Wikipedia, http://wikipedia.org/wiki/Leaching.
"Heap Leaching" Wikipedia, http://en.wikipedia.org/wiki/Heap_leaching.
P.K. Abraitis et. al, "Acid leaching and dissolution major sulphide ore minerals; processes and galvanic effects in complex systms" Miner. Mag., Apr. 2004 v. 68, No. 2 p. 343-351.
Arthur A. Noyes et al, "The Potential of Inert Electrodes in Solutions of Sulfurous Acid and Its Behavior as an Oxidizing and Reducing Agent", J.Am.Chem.Soc.1929, 51(5) p. 1409.

* cited by examiner

*Primary Examiner* — Melissa Swain
(74) *Attorney, Agent, or Firm* — Marcus G. Theodore

(57) ABSTRACT

A redox ore leaching treatment method utilizing sulfurous acid to act as either an oxidizing or a reducing solution via pH adjustment for ore leaching and bioleaching.

12 Claims, No Drawings

ORE LEACHING METHOD FOR METALS RECOVERY

BACKGROUND OF THE INVENTION

1. Field

This invention pertains to mining and ore leaching methods. In particular it pertains to a redox ore leaching method utilizing sulfurous acid to act either as an oxidizing or a reducing solution for heavy metals extraction.

2. State of the Art

Numerous ore leaching methods using sulfuric acid are known. As discussed in Wikipedia, Leaching (metallurgy) "Leaching" is a widely used extractive metallurgy technique which converts metals into soluble salts in aqueous media. Compared to pyrometallurgical operations, leaching is easier to perform and much less harmful, because no gaseous pollution occurs. There are a variety of leaching processes, usually classified by the types of reagents used in the operation. The reagents required depend on the ores or pretreated material to be processed. A typical feed for leaching is either oxide or sulfide.

For material in oxide form, a simple acid leaching reaction can be illustrated by the zinc oxide leaching reaction:

$$ZnO + H_2SO_4 \rightarrow ZnSO_4 + H_2O$$

In this reaction solid ZnO dissolves, forming soluble zinc sulfate.

In many cases other reagents are used to leach oxides. For example, in the metallurgy of aluminum, aluminum oxide is subject to leaching by alkali solutions:

$$Al_2O_3 + 3H_2O + 2NaOH \rightarrow 2NaAl(OH)_4$$

Leaching of sulfides is a more complex process due to the refractory nature of sulfide ores. It often involves the use of pressurized vessels, called autoclaves. A good example of the autoclave leach process can be found in the metallurgy of zinc. It is best described by the following chemical reaction:

$$2ZnS + O_2 + 2H_2SO_4 \rightarrow 2ZnSO_4 + 2H_2O + 2S$$

This reaction proceeds at temperatures above the boiling point of water, thus creating a vapor pressure inside the vessel. Oxygen is injected under pressure, making the total pressure in the autoclave more than 0.6 MPa.

The leaching of precious metals such as gold can be carried out with cyanide or ozone under mild conditions Heap leaching is an industrial mining process to extract precious metals, copper, uranium, and other compounds from ore. The process has ancient origins; one of the classical methods for the manufacture of copperas (iron sulfate) was to heap up iron pyrite and collect the leachate from the heap, which was then boiled with iron to produce iron sulfate.

The mined ore is usually crushed into small chunks and heaped on an impermeable plastic and/or clay lined leach pad where it can be irrigated with a leach solution to dissolve the valuable metals. While sprinklers are occasionally used for irrigation, more often operations use drip irrigation to minimize evaporation, provide more uniform distribution of the leach solution, and avoid damaging the exposed mineral. The solution then percolates through the heap and leaches both the target and other minerals. This process, called the "leach cycle," generally takes from one or two months for simple oxide ores (e.g., most gold ores) to two years (for nickel laterite ores). The leach solution containing the dissolved minerals is then collected, treated in a process plant to recover the target mineral and in some cases precipitate other minerals, and then recycled to the heap after reagent levels are adjusted. Ultimate recovery of the target mineral can range from 30% of contained (run-of-mine dump leaching sulfide copper ores) to over 90% for the easiest to leach ores (some oxide gold ores).

The crushed ore is irrigated with a dilute alkaline cyanide solution. The solution containing the dissolved precious metals ("pregnant solution") continues percolating through the crushed ore until it reaches the liner at the bottom of the heap where it drains into a storage (pregnant solution) pond. After separating the precious metals from the pregnant solution, the dilute cyanide solution (now called "barren solution") is normally re-used in the heap-leach-process or occasionally sent to an industrial water treatment facility where the residual cyanide is treated and residual metals are removed. In very high rainfall areas, such as the tropics, in some cases there is surplus water that is then discharged to the environment, after treatment, posing possible water pollution if treatment is not properly carried out.

For Copper Ores, sulfuric acid is used to dissolve copper from its ores. The acid is recycled from the solvent extraction circuit (see solvent extraction-electrowinning, SX/EW) and reused on the leach pad. A byproduct is iron (II) sulfate, jarosite, which is produced as a byproduct of leaching pyrite, and sometimes even the same sulfuric acid that is needed for the process. Both oxide and sulfide ores can be leached, though the leach cycles are much different and sulfide leaching requires a bacterial or "bio-leach" component. The largest copper heap leach operations are in Chile, Peru, and the southwestern United States.

Although the heap leaching is a low cost-process, it normally has recovery rates of 60-70%, although there are exceptions. It is normally most profitable with low-grade ores. Higher-grade ores are usually put through more complex milling processes where higher recoveries justify the extra cost. The process chosen depends on the properties of the ore.

For nickel ores, the method is an acid heap leaching method like that of the copper method in that it utilizes sulfuric acid instead of cyanide solution to dissolve the target minerals from crushed ore. The amount of sulfuric acid required is much higher than for copper ores (as high as 1,000 kg of acid per tonne of ore, but 500 kg is more common.).

Nickel recovery from the leach solutions is much more complex than for copper and requires various stages of iron and magnesium removal, and the process produces both leached ore residue ("ripios") and chemical precipitates from the recovery plant (principally iron oxide residues, magnesium sulfate and calcium sulfate) in roughly equal proportions. Thus, a unique feature of nickel heap leaching is the need for a tailings disposal area.

The method for uranium ores is similar to copper oxide heap leaching, also using dilute sulfuric acid. The final product is yellowcake and requires significant further processing to produce fuel-grade feed.

Acid leaching, according to the April 2004, v. 58, no. 2; p. 343-351 article by P. K. Abraitis et al. entitled "Acid Leaching and Dissolution of Major Sulphide Ore Minerals: processes and galvanic effects in complex systems is also affected by the electrical potential of the recovery mechanisms.

The sulphide ore minerals sphalerite, galena and chalcopyrite provide the major sources of the world's base metals (Zn, Pb, Cu), whereas pyrite is virtually ubiquitous as a metalliferous mineral in sulphide ore deposits. Acid leaching of these minerals occurs in nature in the context of acid mine drainage (AMD) and acid rock drainage and is of great importance in metal extraction using hydrometallurgical methods, including dump leaching of low-grade ores.

The rates and mechanisms of acid leaching of sulphide minerals of metal sulphides in mixed-mineral systems can be dramatically affected by galvanic effects, with rates increasing by factors as great as ~30 times in some cases. The combination of conventional bulk leaching experiments with surface analysis techniques can lead to new insights into the mechanisms of the dissolution process through an understanding of reaction stoichiometry.

Pesic, U.S. Pat. No. 4,816,235 issued Mar. 28, 1989 discloses a method for obtaining silver and manganese metal from a silver-manganese ore including the step of leaching the ore with acidified thiourea. Reddin et al. U.S. Pat. No. 5,534,234 issued Jul. 9, 1996 discloses a method of recovering manganese in the form of manganese carbonate from ores containing manganese and iron contained in sulfurous acid leach solutions in a divalent state. Hunter et al., U.S. Pat. No. 5,914,441 issued Jun. 22, 1999 discloses a bioleaching method and apparatus for anaerobic oxidation of metal sulfides in ores and concentrates using sulfur-oxidizing bacteria, such as *Thiobacillus ferrooxidans, Thobacillus thiooxidans*, or *Sulfolobus* sp.

Cited for general interest are: Harmon et al, U.S. Pat. No. 7,566,400 issued Jul. 28, 2009 discloses a wastewater chemical/biological treatment method and apparatus for saline wastewater treatment generating biofuels. Harmon et al, U.S. Pat. No. 7,455,773 issued Nov. 25, 2008 discloses a package wastewater chemical/biological treatment plant recovery apparatus and method including soil SAR conditioning. Theodore, U.S. Pat. No. 7,416,668 issued Aug. 26, 2008 discloses a wastewater chemical/biological treatment plant recovery apparatus and method employing sulfurous acid disinfection of wastewater for subsequent biological treatment. Theodore, U.S. Pat. No. 7,563,372 issued Jul. 21, 2009 discloses a package dewatering wastewater treatment system and method including chemical/mechanical separation via drain bags and metal hydroxide removal via lime precipitation. Theodore, U.S. Pat. No. 7,429,329 issued Sep. 30, 2008 discloses a hybrid chemical/mechanical dewatering method and apparatus for sewage treatment plants employing sulfurous acid and alkalinization chemical treatment along with mechanical separation. Theodore et al, U.S. Pat. No. 7,967,990 issued Jun. 28, 2011 discloses a hybrid chemical/mechanical dewatering method for inactivating and removing pharmaceuticals and other contaminants from wastewater employing a sulfurous acid and lime acidification/alkalinization cycle, and an oxidation/reduction cycle to selectively precipitate, inactivate, and remove pharmaceuticals from wastewater. Gong et al, U.S. Pat. No. 7,967,989 issued Jun. 28, 2011 discloses a groundwater recharging wastewater disposal method and apparatus using sulfurous acid acidification to enhance soil aquifer treatment. Harmon et al, U.S. Pat. No. 7,867,398 issued Jan. 11, 2011 discloses a method and apparatus to reduce wastewater treatment plant footprints and costs by employing vacuum recovery of surplus sulfur dioxide. The above methods all use sulfurous acid and are therefore dependent upon the sulfur dioxide, sulfite, and bisulfite concentrations in solution and the oxidation/reduction potential of a desired reaction.

Sulfurous acid behaves as both an oxidizing and reducing agent, see J. Am. Chem. Soc., 1929, 51 (5) pp 1409-1428, "The Potential of Inert Electrodes in Solutions of Sulfurous Acid and Its Behavior as an Oxidizing and Reducing Agent" by Arthur A. Noyes, Harold H. Steinour. Consequently, where the ores to be treated vary in metal composition and valence states, alkaline and mixed mineral states, or require biological treatment requiring either a reducing agent or oxidizing agent, there remains a need for a leaching method to regulate the electrical reduction potential of sulfurous acid leaching solutions. The method described below provides such a pretreatment method.

SUMMARY OF THE INVENTION

Method

The present invention comprises a redox ore leaching method employing sulfurous acid. It comprises first determining the ore's composition and whether acid leaching treatment requires either oxidation or reduction, or both. Next, sulfur dioxide ($SO_2$) is injected into water to be treated to provide $H^+$, $SO_2$, $SO_3^=$, $HSO_3^-$, dithionous acid ($H_2S_2O_4$), and other sulfur intermediate reduction products forming a sulfur dioxide treated aqueous acid. The pH of the sulfurous acid is then adjusted to provide the oxidation or reduction state required for acid leaching or bioleaching. These $H^+$, $SO_2$, $SO_3^=$, $HSO_3^-$, dithionous acid ($H_2S_2O_4$), and other sulfur intermediate reduction products species as discussed by Noyes and Steinour may be affected by the presence of other ions in solution, but in general, the acidic sulfur compounds reduce to a lower oxidation state in accordance with the reaction:

$$3HSO_3- = SO_4^= + S_2O_4^= + H^+ + H_2O - 4660 \text{ cal.} \quad (4)$$

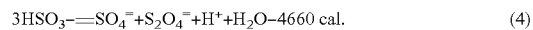

The sulfurous acid and dithionous acid electro-motivate the electrode potential so the actual electrode reaction is $$S_2O_4^= + 2H_2O = 2H^+ + 2HSO_3^- + 2E^- + 415 \text{ cal, or} \quad (5)$$

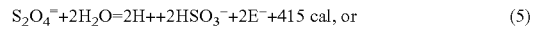

$$S_2O_4^= = 2SO_2(g) + 2E^- + 5015 \text{ cal} \quad (6)$$

The dithionous acid decomposes in the presence of large hydrogen ion concentrations according to the equation:

$$S_2O_4^= + H^+ + H_2O = S + 2HSO_3^- + 46,590 \text{ cal} \quad (8)$$

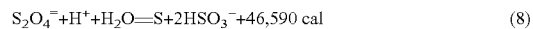

Sulfur rapidly unites with sulfurous acid to form thiosulfuric acid, but until it has significant concentration, the dithionous acid decomposes in accordance with the equation $$S_2O_4^= + H_2O = S_2O_2^= + 2HSO_3^- + 44,015 \text{ cal} \quad (9)$$

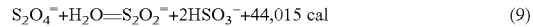

The free-energy values show that Reactions 4, 8 and 9 tend to take place in the direction in which they are written (when the other ion concentrations are 1 molal). At 1 molal, the $S_2O_4^=$ has the following values:

Reaction 4, when it is less than 0.0004 molal.
Reaction 8, when it is greater than 10-17 molal
Reaction 9, when it is greater than 10-16 molal.

Thus, sulfurous acid behaves either as a reducing agent or an oxidizing agent depending on the nature of the combination acted upon and the strength of the acid. Further, at a given acid concentration the reduction potential of the combination acted upon need only be varied by a relatively small amount (20 to 40 mv.) in order to change the action of sulfurous acid from a reducing agent to an oxidizing agent. An increase in acid concentration makes sulfurous acid a less powerful reducing agent, and also a more powerful oxidizing agent.

If a reducing solution is required for ore leaching treatment, the sulfur dioxide is injected into the water without the addition of additional acid. If an oxidizing solution is required, the sulfur dioxide is injected with air, an oxidizing agent, such as ozone, hydrogen peroxide, ferric or ferrous compounds and the pH lowered to provide an oxidizing solution. Oxidation may also require the addition of additional acid. The type of additional acid is selected so that the cations added do not adversely affect the composition of the resultant treated water. For example, the addition of sulfurous acid is preferable to adding hydrochloric acid as the monovalent chlorides adversely affect the salinity of the water when applied to soils adversely affecting certain bacteria, whereas the bivalent sulfates do not.

If both reduction and oxidization is required for ore leaching treatment, first the sulfur dioxide is added to the water to create a reducing solution and held for the dwell time for the reduction mechanisms to effectively reduce the compounds of interest. Next an oxidizing agent (such as air for ease in handling and availability or ozone, hydrogen peroxide or Fenton's reagent are added if a more active oxidizing agent is required) and acid are added to the sulfurous acid solution to form an oxidizing solution to oxidize the compounds of interest. The sulfurous acid treated ores leachates are then pH adjusted to a level required by the end user for electrolytic removal or precipitation of any heavy metals contained therein as metal hydroxides for filtration removal. Lime has the advantage of elevating the pH, precipitating heavy metals as metal hydroxides for filtration removal, and providing calcium to adjust the sodium adsorption ratio (SAR) when required for bacterial treatment. Other alkaline compounds, such as ammonia, may be used when additional nitrogen nutrients are required to promote bacterial action.

With complex ores with mixed composition numerous other components are present. Therefore the amount of sulfurous acid and pH adjustment required must be determined in the field by trial and error as bicarbonates, and other compounds materially affect the amount of sulfur dioxide and acid required for oxidation and reduction. However, the initial estimates of the amount of sulfurous acid may be based on laboratory studies of pure water solutions, such as the Noyes and Steinour studies, which found:

"..." Sulfur dioxide at 25° at 1 atm. In an aqueous solution containing hydrogen ion at 1 molal may be expected to behave toward other oxidation-reduction combinations of substances in three different ways according as the reduction potential of the latter (a) is more negative than −0.37 volt; (b) lies between −0.37 and −0.14 volt; and (c) is more positive than −0.14 volt. (It may be recalled that the value −0.37 is the potential which sulfur dioxide has, under the specified conditions, with respect to its conversion into dithionite ion $S_2O_4^=$ as it exists in the steady reaction state, and that −0.14 is the potential which it has with respect to its conversion to sulfate ion, $SO_4^=$, at 1 molal.) For it is evident that sulfur dioxide may oxidize any combination with a reduction potential more reducing (less negative) than −0.37 volt, and that it may reduce any combination which has a potential more oxidizing (more negative) than −0.14 volt. Therefore it may either oxidize or reduce any combination with a potential between −0.37 and −0.14 volt, and which of these two possible effects actually occurs will depend on the relative rates of the oxidizing reaction and the reducing reaction."

Thus, after determining a mineral's composition and whether acid leaching treatment requires either an oxidizing or reducing solution, or both, sulfur dioxide ($SO_2$) with minimal oxygen or oxygen containing compounds is injected into the acid to create a reducing solution in one mode, or sufficient oxygen or oxygen containing compounds is injected into the sulfur dioxide treated water to create an oxidizing solution in another mode.

The acid pH concentration is similarly adjusted to either insure the electrical conductivity level of the sulfur dioxide treated water is sufficient for release of electrons from the sulfur dioxide, sulfites, bisulfites, and dithionous acid to form a reducing solution to:
  i. reduce oxidants,
  iii. acid leach heavy metals from suspended solid into solution, or Alternatively, the acid concentration is increased sufficiently to accept electrons when the sulfurous acid treated water acts as an oxidizing solution.

The pH of the filtrate may then be raised with an alkaline reagent, such as lime to precipitate heavy metals for removal as metal hydroxides. After removal, a disinfected demetalized filtrate results suitable for raising crops or biological treatment.

For bioleaching, the method comprises chemically treating ores containing heavy metals with sulfur dioxide to acid leach the heavy metals from the ores into solution. The sulfurous acid, ($H_2SO_3$), dissociates to produce $H^+$, bi-sulfite ($HSO_3^-$), sulfite ($SO_3^=$), and free $SO_2$ species in solution, all hereinafter referred to as sulfurous acid. The liquid fraction pH may is then adjusted to that required by bacteria for bioleaching.

The ores are treated with sufficient $SO_2$ to acid leach heavy metals adhering thereto and are then allowed to drain for collection in the liquid fraction. Sulfur dioxide acts as a scavenger molecule to remove excess oxygen and oxidizing chemicals by acting as a reducing agent to inactivate many unwanted pharmaceuticals and chemicals, such as perchlorates, and chromium VI, which may adversely affect plant and animal growth. Perchlorates are reduced to chlorides and chromium VI is reduced to chromium III for subsequent removal as an hydroxide.

Sulfur dioxide has lone electron pairs, allowing it to act as a Lewis base. Additionally it can act as a Lewis acid. The dissolved $SO_2$ gaseous content varies with temperature. For example, the maximum grams/liter of dissolved sulfur dioxide in water at 20 degrees C. is 106.4 gm/L. It is 55.4 gm/L at 40 degrees. It is 32.5 gm/L at 60 degrees, and 21.3 gm/L at 80 degrees. Consequently, sulfurous acid treated waters with free $SO_2$/sulfurous acid/bisulfite/sulfite present in solution at a low pH forms a complex liquid/gas/solid phase chemistry system where reactions are difficult to describe and quantify exactly.

The pH selected for acid leaching of heavy metals may also depend upon the presence of microbes in the ore. Certain microbes eat mining and other waste releasing heavy metals. Nowadays the microbial ore leaching with so-called 'lean ores' represents more than 10% of the total production of copper in the USA alone. The biomethod of extraction for copper from copper ore) uses *Thiobacillus ferrooxidans* bacteria. These bacteria change the copper in the ore into a form that can be readily dissolved by the acid. The dissolved copper is then recovered and subjected to electrolysis to produce unprocessed metal. Bioleaching is one of several applications within biohydrometallurgy and several methods are used to recover copper, zinc, lead, arsenic, antimony, nickel, molybdenum, gold, and cobalt. To encourage the growth of *Acidthiobacillus ferrooxidans*, the pH is adjusted between 1.3 and 4.5 in basal salt medium so that the bacteria derives its biosynthetic requirements by autotrophy using carbon from atmospheric carbon dioxide.

Most species of Thiobacilli are acidotolerant, some even extremely acidotolerant and acidophilic. Some grow best at pH 2 and may grow at pH 1 or even at pH 0.5. Most species are tolerant against heavy metal toxicity. Thiobacilli are chemolithoautotrophs, which means $CO_2$ may be the only source of carbon and they derive their energy from a chemical transformation of inorganic matter. All Thiobacilli oxidize sulfur or sulfur compounds to sulfate or sulfuric acid.

Several species of fungi can be used for bioleaching. Fungi can be grown on many different substrates, such as electronic scrap, catalytic converters, and fly ash from municipal waste incineration. Experiments have shown that two fungal strains (*Aspergillus niger, Penicillium simplicissimum*) were able to mobilize Cu and Sn by 65%, and Al, Ni, Pb, and Zn by more than 95%. *Aspergillus niger* can produce some organic acids such as citric acid This form of leaching does not rely on microbial oxidation of metal, but rather uses microbial metabolism as source of acids which directly dissolve the metal.

To promote the growth of these species, the pH is thus set to promote their growth for acid leaching or secondary polishing to further remove arsenic, selenium, mercury, and nitrates.

Heavy metals are acid leached from the ore into the aqueous fraction, as micro nutrients to promote plant growth or for precipitation of heavy metal hydroxides for filtration removal from the recovered liquid fraction. This leaves heavy metals-free separated water suitable for open water discharge. Some non-heavy metals, such as selenium also co-precipitate with iron hydroxides, and will hereinafter also be referred to as "metal hydroxides"

Generally, the oxides of metals are basic and the oxides of non-metals are acidic because of the following reaction:

Metal Oxide:$Na_2O(s)+H_2O(l)=>2Na^+(aq)+OH^-(aq)$

Non-metal Oxide:$CO_2(g)+H_2O(l)=>H_2CO_3(aq)=>HCO_3^-(aq)+H^+(aq)$

However, some metals are amphoteric and can act as either acids or bases and include metals such as Al, Cr, and Zn. These amphoteric metals, as shown below, form different complexes at differing pHs, depending on the hydrogen and hydroxide concentrations.

With acid Al, Cr, Zn dissolve forming salts and releasing hydrogen gas $2Al(s)+6H^+(aq)\rightarrow Al^{3+}(aq)+3H_2(g)$ $2Cr(s)+6H^+(aq)\rightarrow 2Cr^{3+}(aq)+3H_2(g)$ $Zn(s)+2H^+(aq)\rightarrow Zn^{2+}(aq)+H_2(g)$ With bases they dissolve forming complex ions and hydrogen gas $2Al(s)+2OH^-(aq)+6H_2O(l)\rightarrow 2[Al(OH)_4]^-(aq)+3H_2(g)$ $2Cr(s)+2OH^-(aq)+6H_2O(l)\rightarrow 2[Cr(OH)_4]^-(aq)+3H_2(g)$ $Zn(s)+2OH^-(aq)+2H_2O(l)\rightarrow [Zn(OH)_4]^{2-}(aq)+H_2(g)$ Their amphoteric metal hydroxides dissolve with acid forming a salt and water.

$Al(OH)_3(s)+6H^+(aq)\rightarrow Al^{3+}(aq)+3H_2O(l)$ $Cr(OH)_3(s)+6H^+(aq)\rightarrow Cr^{3+}(aq)+3H_2O(l)$ $Zn(OH)_2(s)+2H^+(aq)\rightarrow Zn^{2+}(aq)+2H_2O(l)$ Their amphoteric metal hydroxides dissolve with a base forming complex ions $Al(OH)_3(s)+OH^-(aq)\rightarrow [Al(OH)_4]^-(aq)$ $Cr(OH)_3(s)+OH^-(aq)\rightarrow [Cr(OH)_4]^-(aq)$ $Zn(OH)_2(s)+2OH^-(aq)\rightarrow [Zn(OH)_4]^{2-}(aq)$ Amphoteric metal oxides found in soils dissolve with sulfurous acid forming salts and water:

$Al_2O_3(s)+6H^+(aq)\rightarrow 2Al^{3+}(aq)+3H_2O(l)$ $Cr_2O_3(s)+6H^+(aq)\rightarrow 2Cr^{3+}(aq)+3H_2O(l)$ $ZnO(s)+2H^+(aq)\rightarrow Zn^{2+}(aq)+H_2O(l)$ At elevated pH, these amphoteric metal oxides dissolve forming complex ions:

$Al_2O_3(s)+2OH^-(aq)+3H_2O(l)\rightarrow 2[Al(OH)_4]^-(aq)$ $Cr_2O3(s)+2OH^-(aq)+3H_2O(l)\rightarrow 2[Cr(OH)_4]^-(aq)$ $ZnO(s)+2OH^-(aq)+H_2O(l)\rightarrow [Zn(OH)4]^{2-}(aq)$ Thus, the heavy metals present in the $SO_2$ treated liquid fraction can be removed as metal hydroxides precipitates for filtration removal as the pH is elevated. The pH required is dependent upon the metals to be removed.

Most metal hydroxides are insoluble. Some such as $Ca(OH)_2$, $Mg(OH)_2$, $Fe(OH)_2$, $Al(OH)_3$ etc are sparingly soluble. However, alkali metal hydroxides $Ca(OH)_2$, KOH, and NaOH are very soluble, making them strong bases. When dissolved, these hydroxides are completely ionized. Since the hydroxide concentration, [$OH^-$], is an integrated property of the solution, the solubility of metal hydroxide depends on pH, pOH or [$OH^-$].

Alkali metal hydroxides LiOH, NaOH, KOH, CsOH are soluble, and their solutions are basic. Hydroxides of alkali earth metals are much less soluble. For example, quicklime (CaO) reacts with water to give slaked lime, which is slightly soluble.

For the amphoteric metal hydroxides dissolving as the pH is raised above their optimal insolubility pH, the pH required may vary from the theoretical based on the presence of other compounds present in the soil so field testing is usually required to determine the optimal solubility for precipitating a given metal from different soils. For example, the following are amphoteric:

| Metal | Optimal theoretical pH | Amphoteric |
|---|---|---|
| $Cu^{+2}$ | 8.2 | yes pH 8-12 |
| $Ni^+$ | 10 | yes 10-12 |
| $Pb^+$ | 8.9 | yes 8.9-10.6 |
| $Cd^+$ | 10.5 | yes 10.5-12 |
| $Cr^{+2,3}$ | 8.5 | yes 8.5-12 |
| $Zn+2$ | 8.5 | yes 8.5-11.8 |
| $Ag+$ | 12. | |

Thus most metal hydroxides are removed by raising the pH from 6.8 to 8.6. For those heavy metals requiring a higher pH, the pH may be sequentially raised in different precipitation steps resulting in metal free filtrate. For example, at higher pH levels, chromium and possibly iron and aluminum become more soluble as $Fe(OH)_4^-$ or $Al(OH)_4^-$ or $Cr(OH)_4^-$ ions. They therefore are removed at the pH at which they precipitate before the pH is then raised higher to remove other heavy metal hydroxides.

After sulfur dioxide-treatment, the resultant liquid fraction is then neutralized with an alkaline reagent, such as ammonium hydroxide, lime or calcium carbonate to inactivate the biocidal properties of the sulfurous acid and raise the pH to that suitable for precipitating out the heavy metals for filtration removal. The heavy metal contents of wastewaters can be effectively removed to acceptable levels by precipitating the metal in an insoluble form. Heavy metals are typically precipitated from wastewater as: hydroxides, sulfides or sometime sulfates, and carbonates. Metal co-precipitation during flocculation with iron or aluminum salts is also possible for some metals (e.g., arsenic). Arsenic is removed by co precipitation with $FeCl_3$ with a $Fe(OH)_3$ floc being formed. The effluent concentration is 0.005 ppm. Cadmium is removed by co precipitation at pH 6.5 with $FeCl_3$ when a $Fe(OH)_3$ floc is formed. The effluent concentration is 0.008 ppm. Mercury can also be removed by co-precipitation with $FeCl_3$ when a $Fe(OH)_3$ floc is formed. The effluent concentration is 0.0005 to 0.005 ppm. Alternatively, mercury can be removed by co-precipitation with alum. The effluent concentration is 0.001 to 0.01 ppm.

If high levels of bicarbonates are present in the water fraction, some metals (lead, cadmium, nickel) form insoluble carbonates that can be used in carbonate precipitation and filtration removal before hydroxide precipitation. These insoluble metal bicarbonates are thus removed before sulfurous acid treatment. The pH required for lead carbonate removed is between 7.5 and 8.5, providing an effluent concentration comparable to that obtained through hydroxide precipitation at high pH.

Sulfurous acid leaching also has the advantage of adding sulfates (after reduction) to the treated water fraction aiding in heavy metals precipitation. Barium can be removed by precipitation as sulfate, by adding any sulfate ion source. The solubility of barium sulfate is 1.4 ppm. Even lower residual barium concentrations (0.5 ppm) can be obtained using an excess of sulfate ions.

Precipitation by hydroxide formation is the most common heavy metal precipitation method. The precipitation typically follows the reaction:

$$M^{+n} + nOH^- \leftrightarrow M(OH)_n$$

Many heavy metals are amphoteric. Therefore their solubility reaches a minimum at a specific pH (different for each metal).

The addition of caustic materials is used to raise the pH. The most common caustics are:
  sodium hydroxide (NaOH)
  calcium hydroxide ($Ca(OH)_2$; lime)

Sodium hydroxide is more expensive than lime, and lime has the advantage of also acting as a coagulant during the precipitation/settling process, whereas NaOH does not. In addition, lime raises the SAR (soil absorptions ratio) of soils overcoming sodium salt buildup to assist in plant growth for phytoextraction, phytoremediation and phytostabilization. Lime also precipitates excess sulfates forming gypsum to assist in plant growth where sulfate levels are too elevated.

Many transition metals (e.g., Cd, Co, Cu, Fe, Hg, Ni, Zn) can form complexes with a number of different ligands such as hydroxides, sulfides, chlorides, cyanides, EDTA (ethylenediaminetetraacetic acid). If hydroxide precipitation is not adequate for heavy metal removal, other different ligands may be employed.

After neutralizing the sulfur dioxide/sulfites/bisulfites, and removing the heavy metal precipitates, the final high pH is then adjusted for phytoremediation, phytoextraction, or phytostabilization by plants, bacteria, and other organisms—usually at a pH range of approximately 6 to approximately 8. Other factors in the selection of this pH are the soil alkalinity in a region, and whether the treated wastewater will be land applied or discharged to an aqueous environment.

The reagents selected for heavy metals precipitation are thus selected not only for their affects on pH, but for their nutrient compositions to raise plants, bacteria, algae and photo biomass, all hereinafter referred to as "biomass". For example, where additional ammonia is required for fertilizer stimulation, ammonium hydroxide may be used to elevate pH for heavy metals precipitation, provided heavy metal precipitates, such as copper, have been previously removed. Phosphates may be added not only to precipitate heavy metals, such as lead, but to add additional fertilizer to the treated waters. Thus, the type of heavy metal also determines what type of plant nutrient is used for phytoextraction.

The treated conditioned water is then pH and SAR adjusted to promote the required plant growth.

Other plants are selected for phytostabilization of the sulfurous acid treated soils to prevent blowing and disturbance of these mined soils, while still others are selected for phytoremediation.

The invention thus provides a method for sulfurous acid leaching of heavy metals from soils into a contaminated water fraction for subsequent precipitation with alkaline and nutrient reagents for filtration removal to provide a metal free soil and reclaimed water suitable for raising crops and biomass and open stream discharge.

The electrical conductivity varies based on the composition of the waters to be treated, but is between −0.37 and −0.14 volt at 25° C. at 1 molal $H^+$ for culinary waters.

Preferably, the sulfur dioxide gas is generated by oxidation of elemental sulfur for injection and capture into an aqueous solution via water scrubbing of a stream of either treated or untreated wastewater, which includes nitrogen and carbon nutrients to feed bacteria for bioleaching, while also forming sulfurous acid ($H_2SO_3$). When used to pre-treat and disinfect wastewater, $SO_2$ conditioning generally results in a color change of the solids from a dark brown to a lighter gray brown color. Similarly, the $SO_2$ treated liquids generally change from a greenish color to a lighter gray brown colloidal suspension color. The malodorous smell of the raw wastewater is replaced by a slight acidic smell. Consequently, the conditioning point for the wastewater can easily be determined by injecting more and more $SO_2$ into the wastewater until the color and odor changes occur—usually observed at a pH of approximately between 1.5 and 3.

The basic acid disassociation chemical reactions of $SO_2$ in water are:

$$SO_2 + H_2O \leftrightarrow H_2SO_3 \text{ sulfurous acid}$$

$$H_2SO_3 \leftrightarrow H^+ + HSO_3^- \text{ bisulfite } pK=1.77$$

$$HSO_3^- \leftrightarrow H^+ + SO_3^{2-} \text{ sulfite } pK=7.20$$

This means 50% of the $SO_2$ is gas at pH 1.77 and 50% is $HSO_3^-$. In a similar manner, 50% is $HSO_3^-$ and 50% is $SO_3^{2-}$ at pH 7.2. Halfway between pH 7.2 and 1.77 and 1.77 is 5.43 as the pH where all of the sulfur exists as the $HSO_3^-$ form. At a pH of 10.86, all of the sulfur should exist as $SO_3^{2-}$.

Making an aqueous solution too acidic (pH 0) will result in an excess of $SO_2$ gas in solution. This will be the point of maximum biocidal activity. However, this will mean the $SO_2$ gas will vent out of solution exposing the operator to $SO_2$. This should be avoided since the best operating conditions will presumably be at the point of about pH 5.43 where dominantly $HSO_3^-$ will exist. The acid level is thus selected ensuring the concentration of the $SO_2$ and acid will not adversely affect the handling equipment.

After heavy metals removal, soil application and conditioning with the sulfur dioxide treated wasters involves the following adjustments:

a. SAR. The Sodium Adsorption Ratio (SAR) indicates the relative activity of sodium ions as they react with clay. The SAR is a property of the water phase. The SAR determines the relative hazard caused by applying water having a high SAR to soil. When the SAR is high (>15), more of the sodium ($Na^+$) ions in the solution phase will become adsorbed onto the solid phase (clay minerals and humus) of the soil. This solid phase of clay minerals and humus contains a net negative electrical charge and is termed the soil Cation Exchange Capacity (CEC). As more sodium ions are adsorbed to the solid phase, the soil aggregates composed of large conglomerations of sand, silt, clay and humus particles become destabilized. This condition is termed dispersion, disaggregation or deflocculation. The result is the transformation of the aggregates into their individual sand, silt, clay and humus particles as opposed to the previously aggregated particles. The result of this transformation is the destruction of the soil's ability to transmit air, water and nutrients to plant roots. As these dispersed silt and clay particles move downward, they cover the previously existing soil pores and effectively block further water infiltration and penetration through the soil.

b. MVCAR. Technically, the SAR should be expanded to include all monovalent cations. Thus, we also use the Mono-Valent Cation Adsorption Ratio (MVCAR), rather than simply the SAR as a measure of potential hazard of the liquid water phase solution. These monovalent cations normally present in water and soils include sodium ($Na^+$), potassium ($K^+$) and ammonium ($NH_4^+$) ions. Municipally treated waste water effluent often has an elevated level of sodium and of ammonium ions. Irrigation of a soil with this type of water (high MVCAR) can cause dispersion, disaggregation, or deflocculation of the soil particles.

c. EC—to insure adequate water infiltration and water permeability through the soil, the Electrical Conductivity (EC) of irrigation water should be brought to greater than 0.3 ds/m or greater than 0.3 mmhos/cm. with the addition of soluble calcium. This prevents deflocculation or dispersion of the soil. When water has been treated to remove all of the major cations [namely, calcium ($Ca^{2+}$), magnesium ($Mg^{2+}$), sodium ($Na^+$), potassium ($K^+$) and ammonium ($NH_4^+$) ions], then another problem occurs. As the total salt concentration approaches zero (as occurs when the Electrical Conductivity EC of the water approaches zero), the soil will disperse easily. This condition occurs during Reverse Osmosis (RO) conditions applying pure filtrate for irrigation. The reason for this dispersion is the system must have a relative equilibrium of adsorbed (solid phase) cations and solution phase cations to maintain the stability of the soil aggregates.

The solution to the soil dispersion problem is first to know what the EC and SAR or MVCAR are for a specific water intended for use as irrigation or for use in water recharge of any underground aquifer. It has long been recognized a high SAR or MVCAR can cause this problem. However, the lower the EC of the water used for irrigation, the greater the hazard of using this water. Second, the only way to insure this problem will not manifest itself and prevent dispersion of the soil system is to add additional soluble calcium ($Ca^{2+}$) ions to the system (regardless of whether the cause is a high SAR or MVCAR or a very low EC in the liquid phase).

The added soluble calcium for this process can be derived from either of two sources. Gypsum (calcium sulfate dihydrate) or calcium carbonated lime plus sulfur dioxide ($SO_2$) forming calcium sulfite reacting to form soluble calcium ions. The soluble calcium ($Ca^{2+}$) ions in the solution phase are attracted to the solid phase CEC sites of the soil particles resulting in flocculation and aggregate stabilization.

Failure to amend water applied to soil will result in the eventual destruction of the soil aggregates and cause dispersion, disaggregation and deflocculation. This hazard can occur under all conditions when the EC is very low (as occurs with rain water, snow melt water or RO treated water). Again, it is critical to increase the level of soluble calcium ($Ca^{2+}$) ions when this very low EC condition occurs in water applied to soil. Irrigation with water having a high ammonium concentration (as occurs with ammonium fertilizer injected into irrigation water) or when municipally treated waste water is irrigated can result in soil dispersion. Again, an adequate concentration of soluble calcium ions must be present to prevent the dispersion, disaggregation or deflocculation of the soil system. The presence of magnesium ($Mg^{2+}$) ions is insufficient to correct this problem.

Furthermore, a high concentration of bicarbonate and/or carbonate can exacerbate the monovalent cation problem. When bicarbonate and/or carbonate are present, they react with the soluble calcium and magnesium converting these ions into insoluble calcium carbonate and magnesium carbonate. This process removes the required calcium ions from the solution phase. This magnifies the problem because the calcium concentration where it appears in the lower fraction of the SAR or the MVCAR formula. The result is the ratio becomes multiplied as a consequence of this precipitation of previously soluble calcium and magnesium ions. Hence, the SAR measurement was retained in the claims to indicate how the retentates are monitored and adjusted to avoid either very low EC conditions or high SAR conditions.

Also, it is crucial to consider the pH of any soil system to insure the pH is near a value of 6.5 (thereby reducing the problem of high bicarbonate and/or carbonate) and insuring the presence of soluble calcium ions existing in the treated system. Failure to make this pH adjustment will cause precipitation of the calcium carbonate and magnesium carbonate. These insoluble carbonates will form inside the existing soil pores and will eventually plug these pores, thereby inhibiting the subsequent movement of water downward through the soil.

From the SAR, the proportion of sodium on the clay can be estimated when irrigation water has been used for a long period with reasonable irrigation practices. The SAR is a good index of the sodium permeability hazard if water passes through the soil and reaches equilibrium with it. From long experience, if the SAR is less than 3, there should be no problems with either sodium or permeability. In the range of 3 to 9, there are increasing problems. Above 9, severe problems can be expected.

A number of state and federal agencies have surveyed soils and preferred crop conditions throughout the United States. For example, the US Department of Agriculture Agricultural Research Service (USDAARS) has established various soil measurement guidelines. Its laboratory personnel have established criteria for diagnosing saline and sodic soils. Electrical conductivity (EC) of the soil saturation extract was introduced as a practical index of soil salinity. The threshold EC value of 4 dS/m is still used world wide to diagnose and classify saline soils. A threshold of 15 for the exchangeable sodium percentage (ESP) defined as the ratio of sodium ($Na^+$) to the total cation exchange capacity [$ESP=((Na^+ \text{ cmol/kg})/(CEC \text{ cmol/kg}))*100$], indicates soil sodicity and permeability and structural problems.

Key practical diagnostic criteria used to evaluate a water's suitability for irrigation and its potential for degrading soils were developed at the USDAARS Salinity Laboratory. These include electrical conductivity (EC) mentioned above, sodium adsorption ratio (SAR), adjusted SAR, and boron (B) hazard. Electrical conductivity is the universal standard measure of a water's salinity hazard. Sodium adsorption ratio is also a universal standard indicating a water's potential to cause sodic conditions and poor soil structure. Both of these indicators are critical for management decisions and together constitute the basis of a classification system for waters with respect to their salinity and sodicity hazard. Adjusted SAR was developed to correct the measure of sodium hazard for the tendency of calcium carbonate to precipitate from irrigation waters and to improve the appraisal of water quality, predicting potential infiltration problems.

The USDAARS Laboratory has also been at the forefront of determining the boron and salt tolerance of enumerable plant species. One USDAARS Laboratory study quantified all available salt tolerance data by presenting threshold salinity values for yield decrease and linear yield decrease per unit of salinity. Thus a given crop's response to salinity can be describe using only two variables, thereby simplifying the selection of an appropriate crop for waters and soils of a given salinity. Salt tolerance tables, thresholds, and yield responses are provided in all manuals and handbooks dealing with crop production on saline soils and/or with saline waters and are used world-wide.

Salt balance and leaching requirements for water used for irrigation has also been established. The salt balance is the difference between the salt input and the salt output for a given irrigation project, and is used to evaluate the adequacy of drainage facilities, leaching programs, and water requirements for removing salts, and sustaining irrigation in general. This method is still used in monitoring programs by many irrigation projects. The leaching requirement establishes the fraction of irrigation water that must be leached through the root zone to maintain an acceptable level of salinity for cropping purposes. Minimized leaching concepts developed by the USDAARS Laboratory were at the core of the water quality control measures adopted for implementation to control salinity of the Colorado River.

USDAARS Laboratory scientists have been at the forefront in developing reclamation procedures and guidelines for saline and sodic soils. To reclaim saline soils, leaching strategies especially continuous ponding and intermittent ponding were developed by Laboratory scientists and are universally used. To reclaim sodic soils, they pioneered the use of the soil amendments: gypsum, sulfuric acid, sulfur, and calcium chloride to replace exchangeable sodium along with leaching. The gypsum requirement, the amount of amendment required to affect reclamation of a given amount of exchangeable sodium, was developed at the Salinity Laboratory and is the universally-used reclamation standard.

These studies established that plants exhibit differences in salinity tolerance at various growth stages. The information allows a cyclical watering strategy where good quality water was used for growth of sensitive crops during sensitive growth stages, while saline drainage water may be used for the growth of tolerant crops or during tolerant growth stages. The U. S. Bureau of Reclamation and the California Resources Agency have adopted minimized leaching and drainage water reuse concepts to conserve water, minimize drainage volumes, and protect water quality as the heart of the San Joaquin Valley Drainage Program.

A preferred sulfurous acid pre-treatment apparatus is as follows. Although sulfur dioxide from tanks associated with a contact mixer can be used to acidify the water to be pretreated, a sulfurous acid generator, such as those produced by Harmon Systems International, LLC of Bakersfield, Calif., is preferred as they are designed to produce the $SO_2$ on demand and on an as needed basis. The $SO_2$ is immediately captured in an aqueous form as sulfurous acid ($H_2SO_3$) preventing harmful operator exposure. The sulfur dioxide is injected into the water at a pH between approximately 1.5 and approximately 3.5, depending upon the dwell time required for conditioning and disinfection. At these pH ranges, sufficient $SO_2$ is generated to condition solids for separation, and disinfection and deodorizing wastewater. It was found through testing the Harmon sulfurous acid generator can condition and treat incoming raw wastewater solids to self agglomerate into colloidal self adhering solids which do not adhere to surfaces The Harmon sulfurous acid generator has the advantage of generating $SO_2$, as needed, avoiding the dangers of $SO_2$ tank storage. However, the main advantage in passing the water directly through the sulfurous acid generator is that it creates and introduces onsite $SO_2$ without adding other compounds or materials such as when using sodium meta-bisulfite and/or potassium meta bisulfite into the system, or additional acid compounds for pH lowering. The method uses both unfiltered and filtered water as the medium to scrub and form the sulfurous acid. Consequently, the treated water volume is not affected.

In one preferred pre-treatment embodiment, the water is fed directly through the Harmon sulfurous acid generator to create concentrated solution of sulfurous acid ($H_2SO_3$). Doing this enhances the redox process because: 1.) Sulfurous Acid will neutralize the Total Alkalinity. 2.) The resulting Bisulfite ($HSO_3^-$) will attack microorganisms within the water for disinfection. 3.) Provide a means in which dissolved oxygen can be scavenged and removed from the water to enhance chemical reduction. 4.) Since the resultant material will be sulfate ($SO_4^{2-}$) enriched, this material can now bond (with other constituents within the water) to form useful compounds (such as calcium sulfate) having the potential of transforming brines in the treated water into desirable and marketable compounds, such as a calcium rich supplement added to replenish depleted soil environments found in areas of high rainfall and/or calcium deficiency).

In summary, the above method provides a redox ore leaching treatment method to remove heavy metals and produce production waters suitable for various soil regions, and soil conditions

We claim:

1. A redox ore leaching treatment method employing a sulfurous acid solution, which can be used to treat a variety of different ores containing one or more of the following gold, silver, copper, lead, cobalt, nickel cadmium, chromium, antimony, zinc, aluminum, and mercury, but only one need be treated, comprising:
   a. determining the composition of ore and its microbes to be acid leached and whether the ore requires acid oxidation, reduction, or both,
   b. injecting sulfur dioxide ($SO_2$) into water to be treated to provide $H^+$, $SO_2$, $SO_3^=$, $HSO_3^-$, dithionous acid ($H_2S_2O_4$), and other sulfur intermediate reduction products forming a sulfur dioxide treated leaching solution to acid leach heavy metals from ores and provide nutrients to feed bioleaching microbes to eat ores to release heavy metals into solution,
   c. monitoring and adjusting the sulfur dioxide treated leaching solution reduction potential to form either an acid oxidizing or acid reducing leaching solution or both by altering the oxidation and reduction states of the sulfites/bisulfites/dithionous acid, and $SO_2$ between −0.37 and −0.14 volts at 25° C. at 1 molal $H^+$ for leaching a particular ore by either:
      i. adding additional sulfur dioxide ($SO_2$) and/or other acid in the presence of oxygen to insure that electrical conductivity levels of the sulfur dioxide treated water are sufficient to accept electrons by the sulfur dioxide, sulfites, bisulfites, and dithionous acid to form an oxidizing leaching solution, or ii. adding the sulfur dioxide without the addition of additional acid or oxygen to insure electrical conductivity levels of the sulfur dioxide treated water are sufficient for release of electrons from the sulfur dioxide, sulfites, bisulfites, and dithionous acid to form a reducing leaching solution, d. monitoring and adjusting the pH of the sulfur dioxide treated leaching solution at a pH between 0.5 and 4.5 to provide sulfites and bisulfites, dithionous acid and $SO_2$ to feed ore leaching microbes to release heavy metals, and e. selectively employing either the acid oxidizing leaching solution or the acid reducing leaching solution with altered oxidation and reduction states of the sulfites/bisulfites/dithionous acid and $SO_2$ for ore leaching microbes and acid leaching to produce a soluble metal salt enriched leachate for chemical and bioleaching metals recovery.

2. A redox ore leaching treatment method according to claim 1, wherein the chemical metals recovery comprises: raising the pH of the leachate with lime to precipitate heavy metals for removal as metal hydroxides.

3. A redox ore leaching treatment method according to claim 2, wherein the bioleaching metals recovery comprises: phytoremediation, phytoextraction, or phytostabilization by plants, bacteria, and other organisms.

4. A redox or leaching treatment method according to claim 1, including, injecting, hydrogen peroxide or other oxygen containing compounds into the sulfur dioxide treated leaching solution to insure that the electrical conductivity level of the sulfur dioxide treated leaching solution, is sufficient to accept electrons to enhance oxidization.

5. A redox ore leaching treatment method according to claim 1, including adding additional sulfite and bisulfite salts to the sulfur dioxide treated leaching solution to provide additional sulfite and bisulfite supplemental nutrients to feed ore leaching microbes, and enhance reduction.

6. A redox ore leaching treatment method according to claim 1, wherein the additional acid added to the sulfur dioxide treated water is selected to enhance oxidation.

7. A redox ore leaching treatment method according to claim 1, wherein the additional acid added is selected to provide compatible anions consistent with the needs of the end user.

8. A redox ore leaching treatment method according to claim 1, for ores, which require both oxidation and reduction acid leaching comprising:
 a. injecting sulfur dioxide ($SO_2$) into water to provide $H^+$, $SO_2$, $SO_3^=$, $HSO_3^-$, dithionous acid ($H_2S_2O_4$), and other sulfur intermediate reduction products forming a sulfur dioxide treated acid leaching solution,
 b. adjusting a portion of the sulfur dioxide treated acid leaching solution reduction potential by altering the oxidation and reduction states of the sulfites/bisulfites/dithionous acid, and $SO_2$ to first form a reducing leaching solution by minimizing oxygen and adding no additional acid to insure the electrical conductivity level of the sulfur dioxide treated leaching solution is sufficient for release of electrons from the sulfur dioxide, sulfites, bisulfites, dithionous acid, and $SO_2$ and applying the reducing leaching solution to the ore to reduce and acid leach heavy metals from ore into solution forming a first filtrate with metal salts for subsequent removal,
 c. injecting oxygen and additional acid into the acid leaching solution to alter the oxidation and reduction states of the sulfites/bisulfites/dithionous acid, and $SO_2$ to insure that the electrical conductivity level of the sulfur dioxide treated first filtrate is sufficient to accept electrons to form an oxidizing leaching solution to oxidize heavy metals,
 d. applying the oxidizing leaching solution to oxidize and acid leach heavy metals from the ore into solution forming a second filtrate with metal salts for subsequent removal, and
 e. raising the pH of the first and second filtrates with lime to precipitate heavy metals for removal as metal hydroxides and forming demetalized filtrates suitable for raising crops and biological treatment.

9. A redox of leaching treatment method according to claim 8, including adding lime and calcium carbonate to adjust the pH and calcium ion concentration of the demetalized filtrates to provide soil concentrations of SAR, less than 15, EC less than 2 dS $m^{-1}$ (m mho $cm^{-1}$), CEC less than 57.5 centimoles/kg, and a pH less than 8; the specific soil ratios and concentration levels selected for raising a particular plant and reduce soil bicarbonates/carbonates to increase soil porosity and improve water penetration.

10. A redox ore leaching treatment method according to claim 9, wherein the filtrates have a pH between 2 and 6.8 for land application to alkaline soils.

11. A redox ore leaching treatment method according to claim 1, wherein the sulfurous acid reducing solution has a free $SO_2$ and bisulfite ($HSO_3^-$) concentration, a pH level, and a dwell time sufficient to affect disinfection of the demetalized filtrate before land application.

12. A redox ore leaching treatment method according to claim 8, wherein the oxidizing solution is first raised to a pH level of up to 11 using lime to precipitate any heavy metals as metal hydroxides for removal, and the resultant metal free filtrate is then pH lowered for raising plants and biological treatment, and providing a soil SAR level suitable for plant propagation and reduce soil carbonates/bicarbonates to improve water penetration.

* * * * *